Jan. 21, 1958 W. C. ANDERSON 2,820,297
LAP ROLL ANALYZER
Filed Feb. 14, 1952 3 Sheets-Sheet 1

INVENTOR
WILMER C. ANDERSON
BY
Louisa E. Norton
ATTORNEY

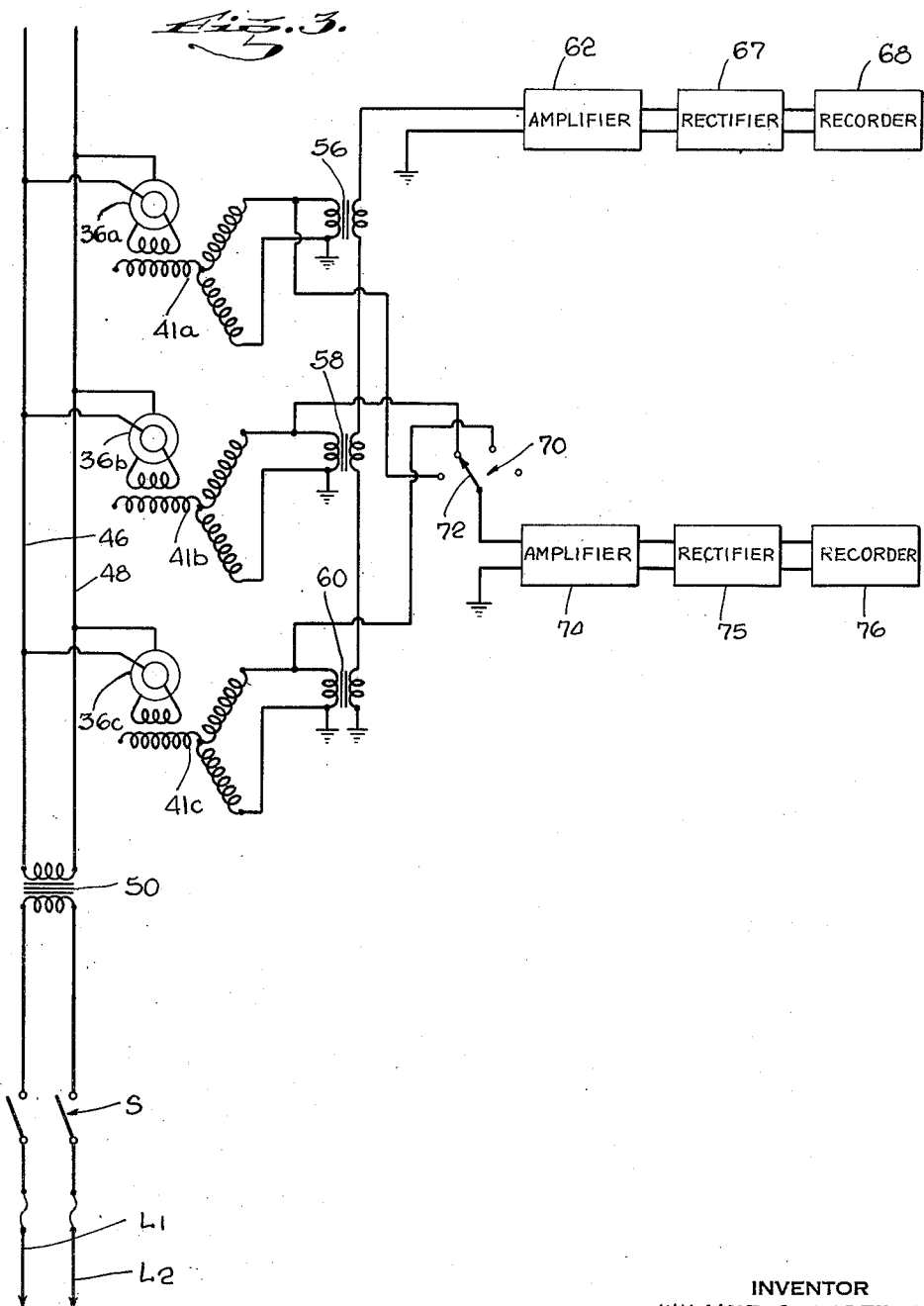

Jan. 21, 1958 W. C. ANDERSON 2,820,297
LAP ROLL ANALYZER

Filed Feb. 14, 1952 3 Sheets-Sheet 3

INVENTOR
WILMER C. ANDERSON
BY
Louisa E. Norton
ATTORNEY

United States Patent Office 2,820,297
Patented Jan. 21, 1958

2,820,297

LAP ROLL ANALYZER

Wilmer C. Anderson, Greenwich, Conn., assignor to Deering Milliken Research Trust, Pendleton, S. C., a trust of Maine Application February 14, 1952, Serial No. 271,471

13 Claims. (Cl. 33—148)

The present invention relates to detecting and measuring apparatus and more particularly to apparatus for detecting variations in thickness of traveling material. The invention comprises apparatus which, while of general application, is of particular value in the textile industry for detecting and measuring variations in thickness in a traveling textile lap. As is well known, the uniformity of the product in each stage of the production of yarn is influenced by the uniformity of the product of the preceding stage. The diameter of sliver or roving drawn from a textile lap of widely varying thickness will vary markedly along its length, as will yarn spun from such roving and hence the further back in the yarn processing that detection and control of irregularities can be made, the better the final product. The device of the present invention, by providing means for continuously detecting variation in lap thickness and for creating an electrical signal varying therewith and suitable for delivery to indicating or recording means, minimizes yarn diameter variations resulting from non-uniform lap thickness. As a textile lap will vary in thickness not only along its length but also across its width, the new device is arranged to yield an output signal varying with the average thickness across the width of the lap. If desired, the apparatus may also yield signals varying with the thickness of the lap at different locations across its width.

Briefly, the device of the invention comprises a plurality of rockable arms carrying feeler rollers adapted to engage a traveling lap at different locations across its width and to be displaced thereby in accordance with the thickness of the lap and means responsive to the angular positions of the arms for creating one or more electrical signals. In the preferred embodiment of the invention each rockable arm is coupled to the movable coil of a synchro generator, and means are provided for creating a voltage varying with the sum of the output voltages of the generators and also for determining the output voltage of each generator separately whereby the average variations in thickness of the entire lap, as well as the variations along different locations across the width of the lap, are detected.

For a better understanding of the invention and of various embodiments thereof, reference may be had to the accompanying drawings, of which—

Fig. 3 is a diagram of the circuit associated with the device of Figs. 1 and 2;

Fig. 4b is a diagram of a suitable circuit for use in connection with the device of Fig. 4a.

Figure 1:
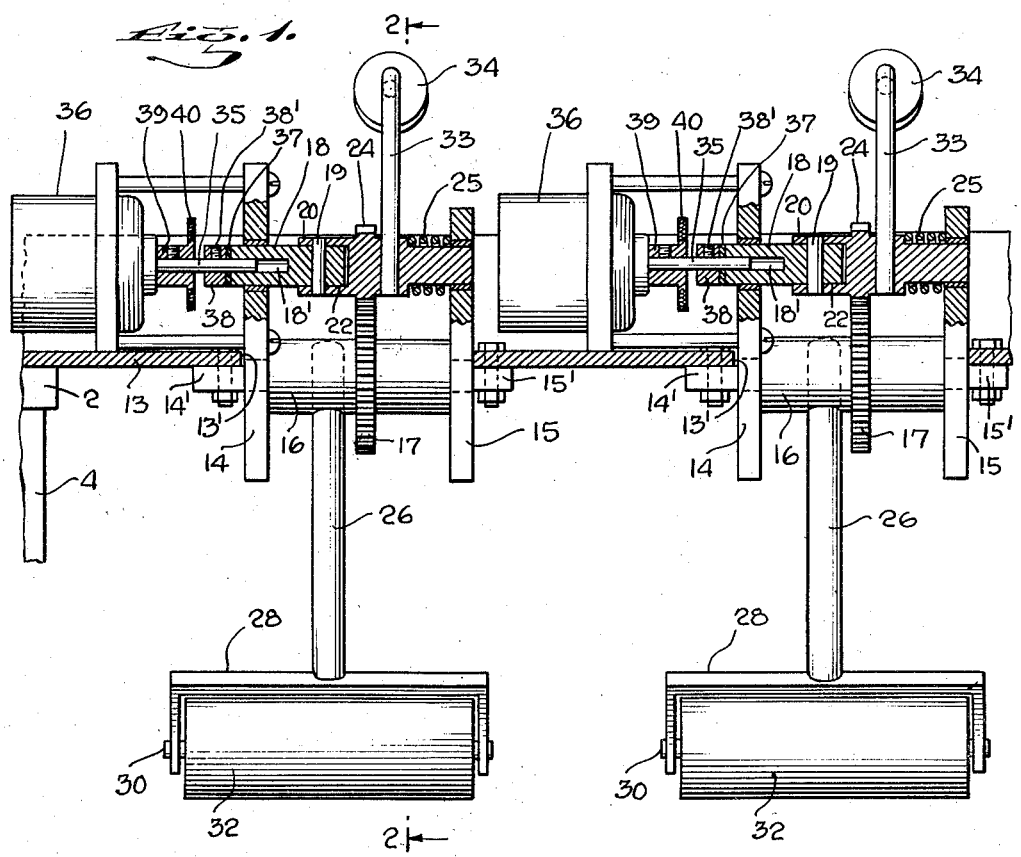
Fig. 1 is a front view, partly in section, of a lap thickness detector embodying the invention and representing the preferred embodiment thereof.
Figure 2:
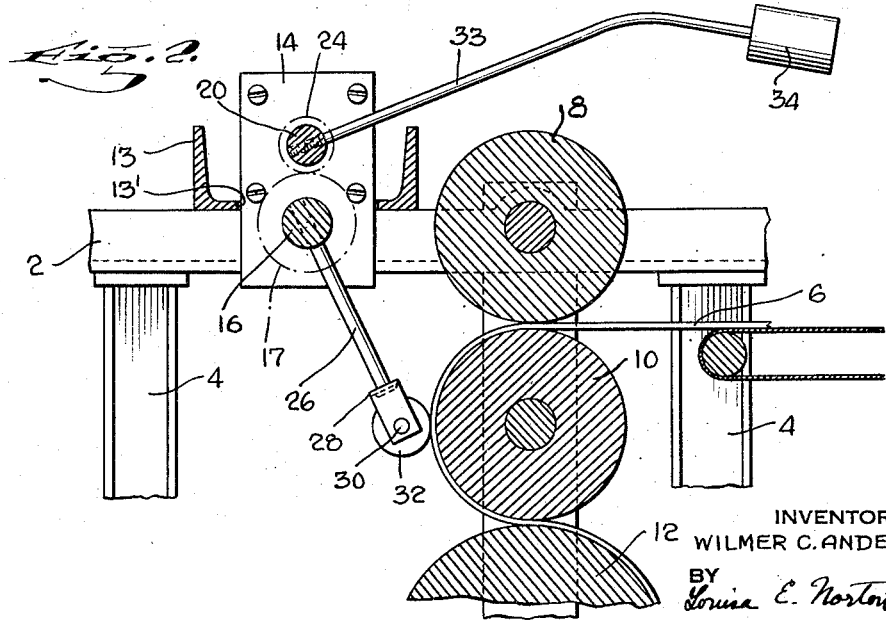
Fig. 2 is a vertical sectional view on a reduced scale of the device of Fig. 1 taken on the line 2—2 thereof.

In Figs. 1 and 2 the reference numeral 2 indicates one of two or more spaced side members mounted on stanchions 4. The members 2 may form parts of a conventional machine for advancing a textile lap 6, the advancing means shown in the drawing comprising rolls 8, 10 and 12 which rotate at equal peripheral speed and are driven by any suitable means (not shown), the lap passing between rolls 8 and 10 around one side of roll 10, and then between rolls 10 and 12. The rolls 8, 10 and 12 may be, for example, the calendar rolls of a picker machine. Spanning the supports 2 adjacent the roll 8 is a U-shaped channel member 13 having spaced openings 13′ in its base.

A pair of vertically disposed plates 14 and 15 are positioned in each opening 13′ at opposite ends thereof. Horizontally projecting lugs 14′ and 15′ on the respective plates 14 and 15 underlie the base of the channel member 13 and are bolted or otherwise secured thereto. These plates carry bearings for the ends of a shaft 16 on which is fixedly mounted, as by riveting, a gear 17. A stub shaft 18, which is rotatably mounted in the plate 14, is coupled, as by a transverse pin 19, to one end of a shaft 20 which has an axial opening 22 for reception of the end of the shaft 18. Each shaft 20 has a gear 24 formed integrally therewith or otherwise fixedly secured thereto which meshes with the gear 17 on shaft 16. A length of shaft 20 remote from shaft 18 is of reduced section and the end thereof is journaled in an opening in plate 15, a compression spring 25 being disposed about the shaft between the plate 15 and the gear carrying portion of the shaft. Mounted at its upper end in a diametrical passage in each shaft 16 is a rod or arm 26 carrying at its lower end a yoke 28 within the arms of which is journaled the axle 30 of a small feeler roller 32 adapted to engage the lap 6. Adjustably secured to each shaft 20 is a rod 33 carrying at its other end a weight 34. As shown best in Fig. 2, the weights 34 through the coupling of the gears 17 and 24 bias the associated rollers 32 into engagement with the lap 6 on roll 10. Thus when the thickness of the lap 6 beneath a roller 32 varies, the associated arm 26 rocks shaft 16 through a small angle in one direction and gear 17 rotates gear 24 to rock shaft 18 in the opposite direction. Each shaft 18 is frictionally coupled to a shaft 35 of the movable coil of an associated synchro generator 36 carried by the channel member 13. Thus the output voltage of the stationary winding of each generator will depend upon the thickness of the lap beneath the associated feeler roll.

The coupling between shafts 18 and 35 comprises a clutch disc 37 of fibre, cork, rubber or the like mounted on the shaft 35 between a collar 38 secured to the shaft by a set-screw 38′ and the adjacent end of shaft 18, shaft 35 extending into an axial passage 18′ in shaft 18 and the parts being urged into engagement by the compression spring 25 on shaft 20. Also fixed to the shaft 35 is a collar 39 provided with a knurled hand wheel 40. Thus to zeroize each generator output for any desired average thickness of the lap, it is only necessary to rotate the shaft 35 thereof by means of the hand wheel 40. If necessary or desired, set-screw 38′ can be loosened slightly during such adjustment to free collar 38 from shaft 35 and thereby uncouple the shafts 35 and 18 and facilitate the turning of shaft 35 by the hand wheel.

The circuit of the device shown in Figs. 1 and 2 is illustrated diagrammatically in Fig. 3, to which reference may now be had. In Fig. 3 the movable coils of three synchro generators are indicated at 36a, 36b and 36c, and the fixed coils thereof are indicated by the Y connections 41a, 41b and 41c. The movable windings 36a, 36b and 36c are energized from leads 46 and 48 which are connected to opposite ends of the secondary of a transformer 50, the primary of which is connected through a suitable switch S to alternating supply lines L-1 and L-2. Two of the coils of winding 41a are connected in series across the primary of a transformer 56 and, similarly, two coils of winding 41b are connected in series across the primary of a transformer 58, and two coils of the winding 41c are connected in series across the primary of transformer 60. The secondaries of transformers 56, 58 and 60 are connected in series and one end of this series circuit is grounded and the other end connected to the ungrounded input terminal of an amplifier 62. The output of amplifier 62 is impressed through a rectifier 67 upon a suitable recorder 68. With this arrangement the average thickness of the lap across the width thereof is obtained in terms of a voltage impressed upon the amplifier 62 by the summing circuit comprising the secondaries of transformers 56, 58 and 60. Thus this summing circuit, or loop, operatively interconnects the feeler rolls by virtue of its electro-mechanical connection thereto through the intermediary of the synchro-generators. The circuit of Fig. 3 also includes means for indicating or recording the various output voltages of the generators. For this purpose a rotary switch 70 is provided with a plurality of fixed contacts for engagement by a switch arm 72. The fixed contacts are connected to the ungrounded ends of the primaries of transformers 56, 58 and 60, and switch arm 72 is connected to the ungrounded input terminal of an amplifier 74 the output of which is connected through a rectifier 75 to a suitable recorder 76. Recorder 76 may be, and preferably is, a separate channel of the recorder 68. With this arrangement, depending upon the position of switch arm 72, a separate recording is obtained of the output of any one of the generators. If desired, the rotary arm 72 of the switch 70 may be driven at a slow rate by any suitable means in order to yield consecutive recording of the separate outputs. This arrangement is of value in detecting defects in the lap processing machine as, for example, unevenly worn rolls or non-uniform pressure conditions between rolls.

Figure 4A:
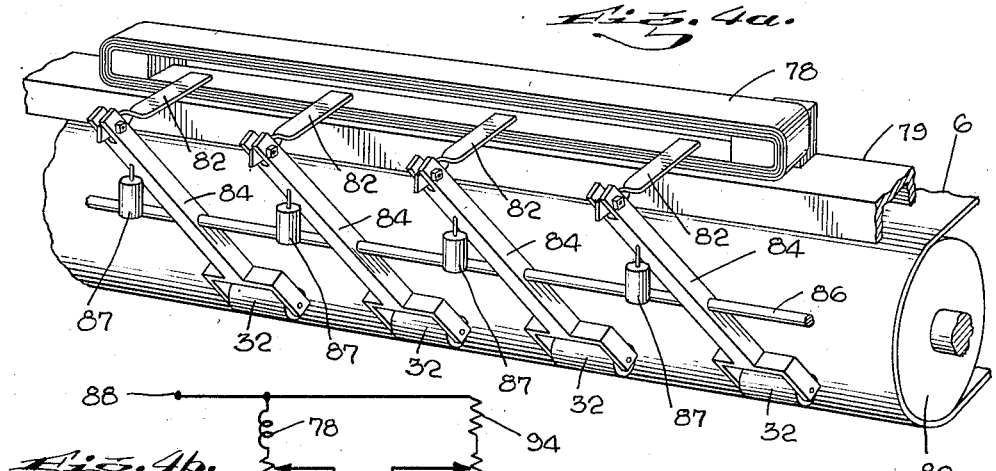
Fig. 4a is a diagrammatic isometric view of a lap thickness detector representing another embodiment of the invention.
Figure 4B:
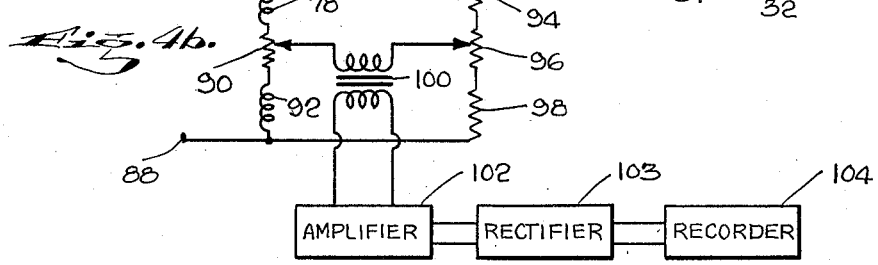

The embodiment of the invention illustrated in Figs. 4a and 4b differs from the preferred embodiment of the invention above described in that only the average thickness of the width of the lap is obtained and in that the output signal is obtained as a result of a change in magnetic induction. As diagrammatically illustrated in Fig. 4a, an elongated air-core coil 78 is mounted on a frame 79 above a lap roll 80 with its core positioned for introduction therein of blades 82 of high magnetic permeability carried on the ends of pivotally mounted arms 84. The arms 84, which correspond to arms 26 of the embodiment of the invention illustrated in Figs. 1 and 2, carry at their lower ends the feeler rollers 32 adapted to engage and ride on the lap 6. Each arm 84 is rotatable intermediate its ends on a shaft 86 extending across the lap. The rollers are biased into contact with the lap by weights 87 secured to the arms 84 above the shaft 86. With this arrangement the inductance of the coil 78 will depend upon the position of the blades 82, the further the blades penetrate into the core of the coil the greater the inductance of the coil. The overall inductance of the coil thus depends upon the average thickness of the lap and by inserting the coil in a suitable circuit, as for example that shown in Fig. 4b, an output signal for delivery to indicating or recording means may be obtained. The circuit of Fig. 4b, which is indicative of the type of circuit that may be employed, comprises a bridge circuit, the input terminals 88 of which are connected to any suitable source of alternating current. Connected across the input terminals are two series circuits, one comprising the coil 78, a resistor 90, and an inductor 92, and the other comprising three resistors 94, 96 and 98. The output circuit comprising the primary of a transformer 100 is connected between adjustable taps on resistors 90 and 96. By adjustment of the taps on resistors 90 and 96, the bridge may be brought to balance for any desired inductance of the coil 78 corresponding to the desired average thickness of the lap 6. Upon departure of the inductance of coil 78 from such value, the bridge balance is disturbed and an output voltage is created across the secondary winding of transformer 100. This secondary may be connected through a suitable amplifier 102 and rectifier 103 to recorder 104 or other indicating means. Thus, in this embodiment of the invention, as in the embodiment of the invention illustrated in Figs. 1 through 3, an output summing loop, the circuit of the elongated air core coil 78 or the circuit coupled thereto, is electro-mechanically coupled to and interconnects the feeler rolls.

Figure 5:
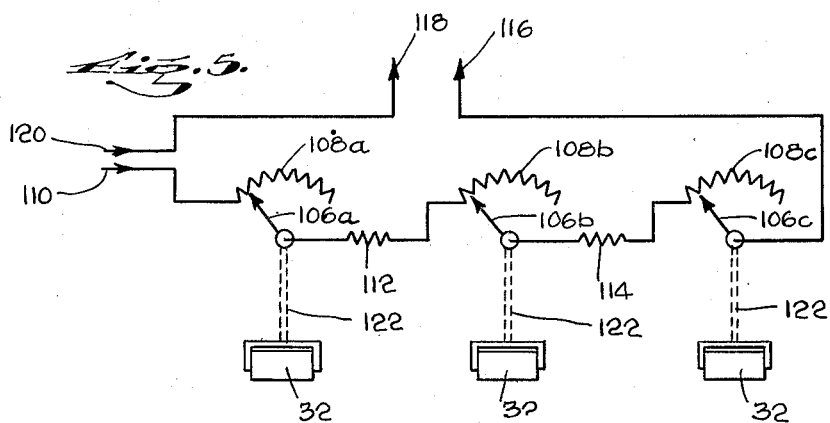
Fig. 5 is a diagrammatic representation of another embodiment of the invention.

Still another suitable arrangement for converting displacement of the rollers 32 into an electrical output signal varying with the average thickness of the lap, is illustrated diagrammatically in Fig. 5. In this arrangement the displacements of the rollers 32 are utilized to control the positions of wiper arms 106a, 106b and 106c of a plurality of resistors 108a, 108b, 108c. One end of resistor 108a is connected to one input terminal 110 of a source of voltage and the wiper 106a is connected through a resistor 112 with the resistor 108b, the wiper arm 106b of which is connected through a resistor 114 to the resistor 108c. The wiper arm 106c is in turn connected to one output terminal 116, the other output terminal 118 being connected to the other input terminal 120. Thus the voltage across output terminals 116 and 118, assuming constant voltage impressed across input terminals 110 and 120, will vary with the amount of resistance in the circuit and therefore in accordance with the angular position of the arms supporting the rollers 32, the series circuit, as in the earlier embodiments of the invention, serving as a common output loop electro-mechanically coupled to and interconnecting the feeler members. For convenience and to simplify the drawings, the mechanical connections between the shafts of the wiper arms and the feeler rollers have not been illustrated in the drawing but are symbolically indicated by the broken lines 122.

The invention has now been described with reference to various embodiments thereof. In each of the described embodiments variations in lap thickness are mechanically detected and converted into an electrical control signal. Obviously, various changes in the particular constructions illustrated, as well as in the particular circuits described, could be made without departing from the spirit of the invention or the scope of the accompanying claims.

The following is claimed:

1. A device for detecting variations in thickness of a textile lap traveling over a roll in the direction of its length which comprises a plurality of members positioned to contact the lap while traveling over said roll, said members being laterally spaced with respect to the width of the lap, means biasing said members into engagement with the lap, and mechanico-electrical transducing means associated with said members and continuously responsive to displacements thereof in a direction having a component normal to the surface of the lap for creating an instantaneous electrical signal indicative of the instananeous average thickness of the lap across the width thereof, said transducing means including a common electrical output summing loop operatively electro-mechanically connected to and interconnecting each of said members.

2. The device according to claim 1 wherein said mechanico-electrical transducing means comprises a plurality of electrically interconnected transducers having a common electrical output circuit, each said transducer being associated with one of said members and means for selectively converting the output of any one of said transducers into a correspondingly varying electrical signal indicative of the thickness of the lap at the location of the member associated with such transducer.

3. The device according to claim 1 wherein said transducing means comprises a common elongated air core coil extending across the width of the lap, means for energizing said coil and a plurality of elements of magnetically permeable material each operatively coupled with one of said members and adapted to penetrate the core of said coil to an extent determined by the displacement of its associated one of said members whereby variations in thickness of the lap are reflected as variations in the inductance of said coil.

4. The device according to claim 1 wherein said transducing means comprises a common series circuit including a plurality of variable resistors and means mechanically coupling each of said members with a corresponding one of said resistors to vary the current in said circuit in accordance with the displacement of said members.

5. The device according to claim 2 wherein said mechanico electrical transducers are synchro generators each having an energized rotor mechanically coupled to the associated member and operatively electrically interconnected fixed coils for induction of voltages therein in accordance with the angular position of the rotor as determined by the associated member, the algebraic sum of the voltages induced in the fixed coils of said generator yielding the signal indicative of average lap thickness and the voltage induced in the fixed coils of any selected one of said generators yielding a signal indicative of the thickness of the lap at the location of the member associated with said generator.

6. A lap thickness analyzer for detecting variations in thickness in a traveling textile lap which comprises at least one feeler roller biased into engagement with a surface of the lap, a synchro generator having fixed coils and a rotor coil, means normally energizing said rotor coil, means coupling said feeler to said rotor coil for continuously correlating the angular position thereof to the thickness of the lap as determined by displacement of the roller in a direction having a component perpendicular to the surface of the lap, a circuit coupled to the fixed coils of said generator for yielding a continuous output signal indicative of lap thickness said means for coupling said feeler to the rotor coil of said generator comprising a shaft fixed to the rotor coil for rotation thereof, a second shaft disposed with its axis in alinement with said rotor shaft, said shaft being coupled together for conjoint rotation, a gear fixed to said second shaft, a third shaft disposed with its axis parallel to said first and second shafts, a gear fixed to said third shaft and adapted to mesh with said gear on said second shaft, and an arm fixed at one end to said third shaft and radially disposed with respect thereto, said arm rotatably supporting at its other end said feeler roller, and means connected to said second shaft and tending to rotate it in a predetermined direction for providing the bias for urging said feeler roller into engagement with the lap.

7. The lap thickness analyzer according to claim 6 wherein the coupling between said first and second shafts comprises a releasable friction clutch and wherein means fixed to said first shaft are provided for adjusting the angular position of the rotor coil independently of said second shaft.

8. A lap thickness analyzer comprising in combination pivotally mounted arms a plurality of feeler rollers each rotatably mounted on the end of one of said pivotally mounted arms and biased into engagement with the surface of a traveling textile lap, said rollers being laterally spaced to engage the lap at different locations across its width, a synchro generator associated with each feeler roller and having an energized rotor mechanically coupled to the support arm of the associated roller, and fixed coils for induction of voltages therein in accordance with the angular position of the rotor as determined by the associated feeler roller, and means continuously varying with the algebraic sum of the voltages induced in the fixed coils of said synchro generators for signifying lap thickness.

9. The lap thickness analyzer according to claim 8 including means for selectively converting the induced voltage in the fixed coils of any one of said generators into a correspondingly varying electrical signal.

10. The lap thickness analyzer according to claim 8 wherein said last mentioned means comprise a plurality of transformers having primary and secondary windings, means connecting the fixed coils of each generator across the primary winding of a different one of said transformers, an output circuit in which the secondary windings of said transformers are serially connected and amplifying and signifying means energized from said output circuit.

11. A device for detecting variations in thickness of a textile lap comprising in combination a feed roll for advancing the lap in the direction of its length, a plurality of members positioned to be rotated by engagement with the lap while traveling over said feed roll, said members being laterally spaced with respect to the width of the lap, means biasing said members into engagement with the lap, a transducing means associated with each member and responsive to displacement thereof in a direction having a component normal to the surface of the material for creating an electrical signal indicative of the extent of displacement of the associated member, and means responsive to said signals for signallizing variations in the average thickness of the lap across the width thereof.

12. A lap thickness analyzer for detecting variations in thickness in a textile lap comprising in combination a feed roll for advancing the lap in the direction of its length, at least two feeler rollers biased into engagement with the lap while traveling over said feed roll, a synchro generator associated with each feeler roller, each of said synchro generators having fixed coils and a normally energized rotor coil, means coupling each feeler roller to the rotor coil of the associated synchro-generator for continuously correlating the angular position of the rotor coil to the thickness of the lap as determined by displacement of the feeler roller in a direction having a component normal to the surface of the lap, a circuit coupled to the fixed coils of each synchro generator and an output circuit coupled to said first mentioned circuits for yielding an output signal indicative of the average thickness of the lap at the locations of engagement with the feeler rollers.

13. A lap thickness analyzer comprising in combination, a plurality of pivotally mounted arms, a plurality of feeler rollers each rotatably mounted on the end of one of said pivotally mounted arms and biased into engagement with the surface of a traveling textile lap, said rollers being laterally spaced to engage the lap at different locations across its width, a synchro-generator associated with each feeler roller and having stator and rotor windings, means mechanically coupling the rotor winding of each synchro-generator to the support arm of the associated feeler roller, means for energizing one of the windings of each synchro-generator and means continuously responsive to the algebraic sum of the voltages induced in the other windings of the synchro-generators for signifying average lap thickness at the locations of the feeler rollers.

References Cited in the file of this patent

UNITED STATES PATENTS

| 1,540,969 | Walen et al. | June 9, 1925 |
| 1,560,046 | Dye | Nov. 3, 1925 |
| 1,638,913 | Brophy et al. | Aug. 16, 1927 |
| 1,655,244 | Rowell | Jan. 3, 1928 |
| 1,704,386 | Harding | Mar. 5, 1929 |
| 1,858,304 | McLaughlin | May 17, 1932 |
| 2,056,918 | Bristol et al. | Oct. 6, 1936 |
| 2,137,368 | Terry | Nov. 22, 1938 |
| 2,146,277 | Wilson | Feb. 7, 1939 |

(Other references on following page)

UNITED STATES PATENTS

| | | |
|---|---|---|
| 2,146,442 | Price | Feb. 7, 1939 |
| 2,177,051 | Birmingham | Oct. 24, 1939 |
| 2,323,818 | Lessmann | July 6, 1943 |
| 2,336,994 | Mackay | Dec. 14, 1943 |
| 2,381,990 | Stevens | Aug. 14, 1945 |
| 2,468,972 | Hagerty | May 3, 1949 |
| 2,553,129 | Burnett | May 15, 1951 |
| 2,642,664 | Wilson et al. | June 23, 1953 |
| 2,676,412 | Griffin | Apr. 27, 1954 |
| 2,680,299 | Strother | June 8, 1954 |

FOREIGN PATENTS

| | | |
|---|---|---|
| 163,692 | Great Britain | Feb. 16, 1922 |

OTHER REFERENCES

"Selsyns," September 1930, General Electric publication, pp. 1–3.

"Popular Science," April 1942, p. 66.